(12) United States Patent
Seiler et al.

(10) Patent No.: US 6,212,642 B1
(45) Date of Patent: Apr. 3, 2001

(54) MANAGEMENT OF DATA BEFORE ZERO VOLT SUSPEND IN COMPUTER POWER MANAGEMENT

(75) Inventors: William J. Seiler, Scotts Valley; Dan Kikinis, Saratoga, both of CA (US)

(73) Assignee: Elonex P.L.C., London (GB)

( * ) Notice: Subject to any disclaimer, the term of this patent is extended or adjusted under 35 U.S.C. 154(b) by 0 days.

(21) Appl. No.: 08/911,467

(22) Filed: Aug. 14, 1997

Related U.S. Application Data

(63) Continuation of application No. 08/358,201, filed on Dec. 16, 1994, now abandoned.

(51) Int. Cl.$^7$ .................................................. G06F 1/32
(52) U.S. Cl. ........................................... 713/324; 713/320
(58) Field of Search ..................................... 713/300–340

(56) References Cited

U.S. PATENT DOCUMENTS

| | | | |
|---|---|---|---|
| 4,891,760 | * 1/1990 | Kashiwazaki et al. | 364/443 |
| 5,414,861 | * 5/1995 | Horning | 395/750 |
| 5,446,904 | * 8/1995 | Belt et al. | 395/750 |
| 5,524,248 | * 6/1996 | Parks et al. | 395/730 |

\* cited by examiner

Primary Examiner—Ayaz R. Sheikh
Assistant Examiner—David A. Wiley
(74) Attorney, Agent, or Firm—Donald R. Boys; Central Coast Patent Agency

(57) ABSTRACT

A power management system for computers compresses contents of system RAM and stores the contents on a non-volatile storage device before power is suspended to a motherboard, which removes power also from RAM. By compression, the capacity required of the non-volatile storage device is minimized. In a variation, zeros are stored in all RAM area used by memory management software before compression and storage on the non-volatile device. In another variation, areas of RAM used by memory management software are identified, and only those areas not used by memory management software are stored on the non-volatile device. The capability is provided in several ways in different embodiments.

2 Claims, 8 Drawing Sheets

MANAGEMENT OF DATA BEFORE ZERO VOLT SUSPEND IN COMPUTER POWER MANAGEMENT

CROSS REFERENCE TO THE RELATED APPLICATIONS

This is a continuation application Ser. No. 08/358,201 filed Dec.16, 1994 now abandoned.

FIELD OF THE INVENTION

The present invention is in the area of power management for computer systems, and relates specifically to methods and apparatus for saving contents of random access memory (RAM) before performing suspend mode in power management.

BACKGROUND OF THE INVENTION

Power management for computer systems has become a significant issue as the number and size of computer systems continues to increase dramatically. Virtually all computer manufacturers are now offering options for power management, wherein power is removed from selected subsystems for idle computers.

Typically, power-saving computers employ as many as four levels, or modes, of power consumption. A first mode, often called peak mode, provides for the power on surge, which, for a typical desktop computer, may be in the area of 90 to 100 watts. A second mode, which may be considered normal mode, provides for full, routine operation, including full expansion capabilities, and may be, for example, in the area of 50 watts.

Most power-managed computers have a suspend mode, triggered by a period of inactivity, wherein power to peripherals and ancillary equipment is suspended, but power remains for the system CPU and RAM. This suspend mode typically consumes about 10–15 watts. Power up from suspend is relatively quick, because RAM is retained in the condition last accessed, and no time must be consumed in restoring RAM.

The most severe power-down mode in most power management schemes is often called Zero-Volt Suspend (ZVS) in the art. In this mode, power is removed from all system components except a controller, such as the keyboard controller, which is capable of sensing resumption of system activity. Use of the keyboard controller for this purpose is convenient, and other controllers might be used. In ZVS, the computer sleeps with one eye open, to power back up again whenever a user provides input, such as movement of a pointer device or a keystroke at the keyboard. Generically, the controller that is utilized to monitor for resumption of user activity while in ZVS may be called the ZVS controller.

In ZVS mode, as described above, power is removed from RAM. Still, it is highly desirable that the computer start exactly where it left off when power is restored to all operating systems. It is necessary then, that the contents of RAM be saved on a non-volatile device before power is removed from RAM. Then, in power up mode, the designated non-volatile device can be accessed to restore all of the previous contents of RAM, so activity may be resumed exactly where suspended. Commercially available power management systems operate in just this manner to allow resumption of activities where suspended.

It is quite common in modern computers to have quite large on-board RAM. Sixteen megabytes or more is not at all uncommon, and such relatively large RAM configurations are necessary for operating with some operating systems and window-type management programs, for example. In normal operation, with window-type management systems, having, perhaps, more than one application running, nearly all of a large RAM configuration may be in use.

It is also quite common in modern computer systems to have relatively large non-volatile storage available to the system. Where a twenty megabyte hard disk drive was once thought adequate, several hundred megabytes is now common.

There are at least two potential problems with ZVS in power management systems and modem computers. One is that transfer of large amounts of data from RAM to a designated non-volatile device, such as a disk drive, and subsequent restoration of the same data from the non-volatile device to RAM before resumption of operations can be time-consuming.

Another potential problem is that, even though the designated non-volatile device for saving RAM may be several times larger than the RAM configuration, there is no guarantee that there will be sufficient unused space on the device to store all of the data in RAM before initiation of a ZVS state. And, if there is insufficient space, some data may be lost, or the power-saving operations may have to be aborted.

What is clearly needed is a power management system configured to minimize the amount of information that may need to be stored to accomplish VZS, and also configured to compress the data in RAM before transfer to the designated non-volatile device, so a minimum amount of non-volatile storage space is needed.

SUMMARY OF THE INVENTION

In a preferred embodiment of the present invention, a method is provided for saving contents of random access memory (RAM) prior to power suspension in a power managed computer system, to ensure that the computer system can be restarted at the point where activity is suspended. The method has steps of (a) compressing the contents of system RAM, creating a compressed version of system RAM; and (b) storing the compressed version of system RAM on a non-volatile storage device before removing power from system RAM. In one embodiment, the non-volatile storage device is a hard disk drive, and the steps are performed in response to execution of power management software, which is, in one embodiment, a part of a BIOS.

In a further embodiment, areas used by memory management software are first identified, and zeros are stored in such areas before compression takes place. In a variation, compression is not done, but only those portions of RAM not used by memory management software are saved to a non-volatile device before power suspension.

In various embodiments, power management software is provided having the capability of the methods above described; a system BIOS is supplied with these features, and a computer is provided having power management software according to the invention.

The various embodiments of the invention provide for minimizing the storage capacity required of a peripheral non-volatile device before power suspension to the system RAM.

DESCRIPTION OF THE PREFERRED EMBODIMENTS

Figure 1A:
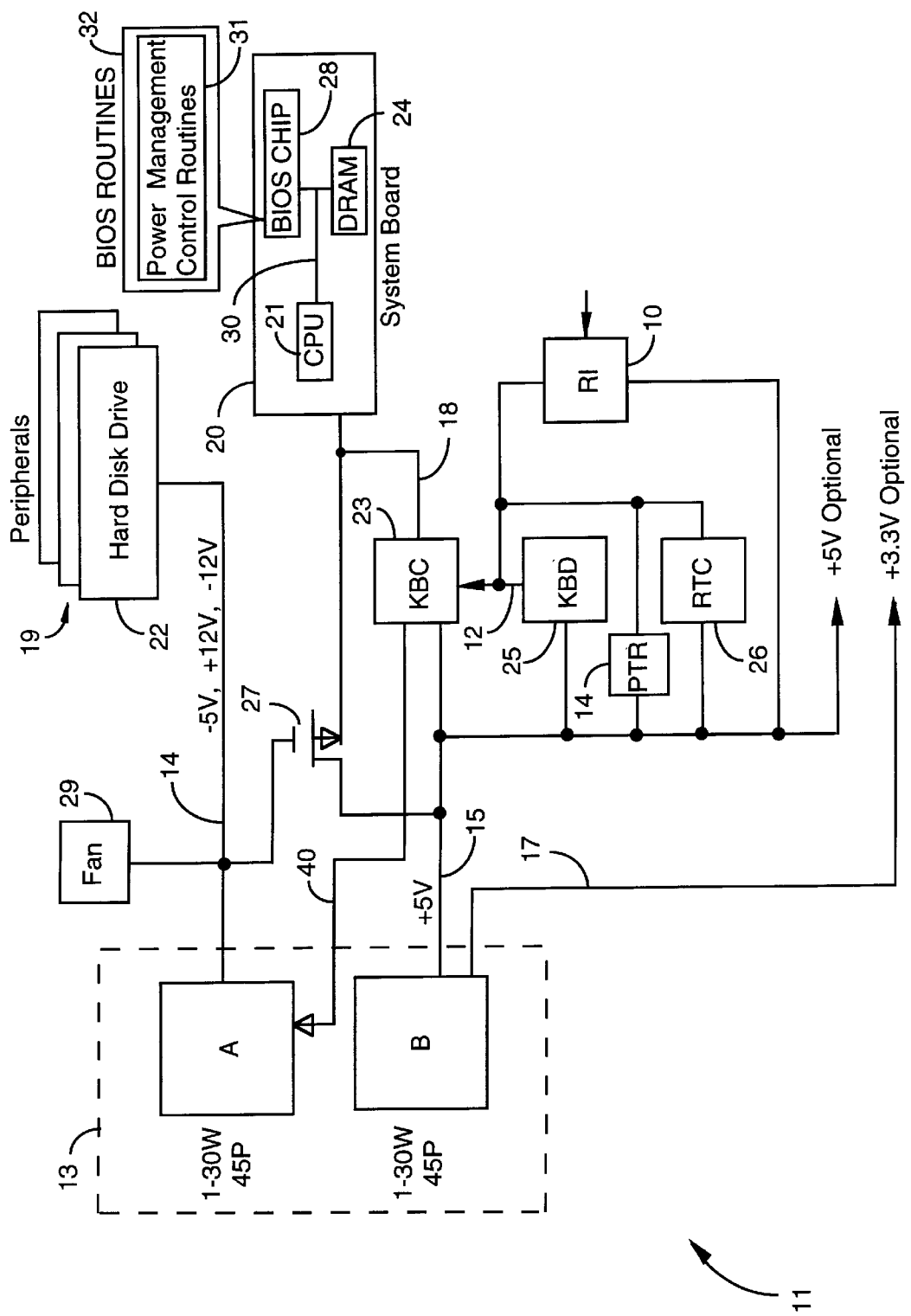
FIG. 1A is a block diagram of a computer system having a power management system according to the present invention.

FIG. 1A is a block diagram of a computer system 11 having a power management system according to the present invention. The computer system of FIG. 1A comprises a power supply 13, which in this example comprises two power supply modules A and B. Power is supplied from module A to peripherals 19, including a hard disk drive 22, a fan 29 and an electrically-operable switch 27. In many systems there are more peripherals than the few indicated here for the sake of example. Power is supplied from module B to keyboard controller (KBC) 23, a keyboard (KBD) 25, a pointer device (PTR) 14, a real-time clock (RTC) 26, and to a ring indicator (RI) 10. Power is also supplied from module B to a system board 20 through a normally-open path of electrically-operable switch 27.

Motherboard 20 comprises a CPU 21, a DRAM memory system 24, and a system BIOS chip 28 which communicate on a parallel bus structure 30. In many systems there are several other elements and components on the system board than the few here indicated for purposes of example. Also, the parallel bus structure extends to peripherals 19, although this is not shown explicitly in FIG. 1A for the sake of simplicity. BIOS control routines 32 reside on BIOS chip 28 and are read into a prearranged location in system RAM on startup and reset, and typically operate from RAM after initialization.

The diagram of FIG. 1A is exemplary of power management architecture, and it will be apparent to those with skill in the art that there are a number of ways the elements could be configured and connected. The purpose in this instance of two power supply modules, A and B, is to improve efficiency by powering low power modes by a power supply with a lesser capacity than that required to power the entire system. Two modules are not necessary for the present invention.

In computer system 11, power management control routines 31, according to an embodiment of the present invention, are conveniently a part of BIOS control routines 32, although they could conceivably reside elsewhere.

In the system of FIG. 1A, KBC 23 is configured to turn power supply module A off and on via line 40. Typically, in this configuration, after a pre-arranged time interval without sensed user input activity or an incoming signal to the ring indicator, RAM contents are saved and power supply A is shut off, which causes switch 27 to open, removing power also from system board 20. The system thus enters a suspend mode with only the KBC, the KBD, the PTR, the RTC, and the RI powered. Renewed activity or an incoming signal to the RI causes the KBC to turn power supply module A on again, which also triggers switch 27 returning power to the system board. Once power is returned to the system board, the power management control routines may restore the contents of RAM to bring the computer system back to the operating position where ZVS was first activated. In FIG. 1A, line 18 from KBC 23 indicates a power bypass through KBC 23 for powering system board 20 in another power level, wherein only the fan and peripherals are shut down.

Figure 1B:
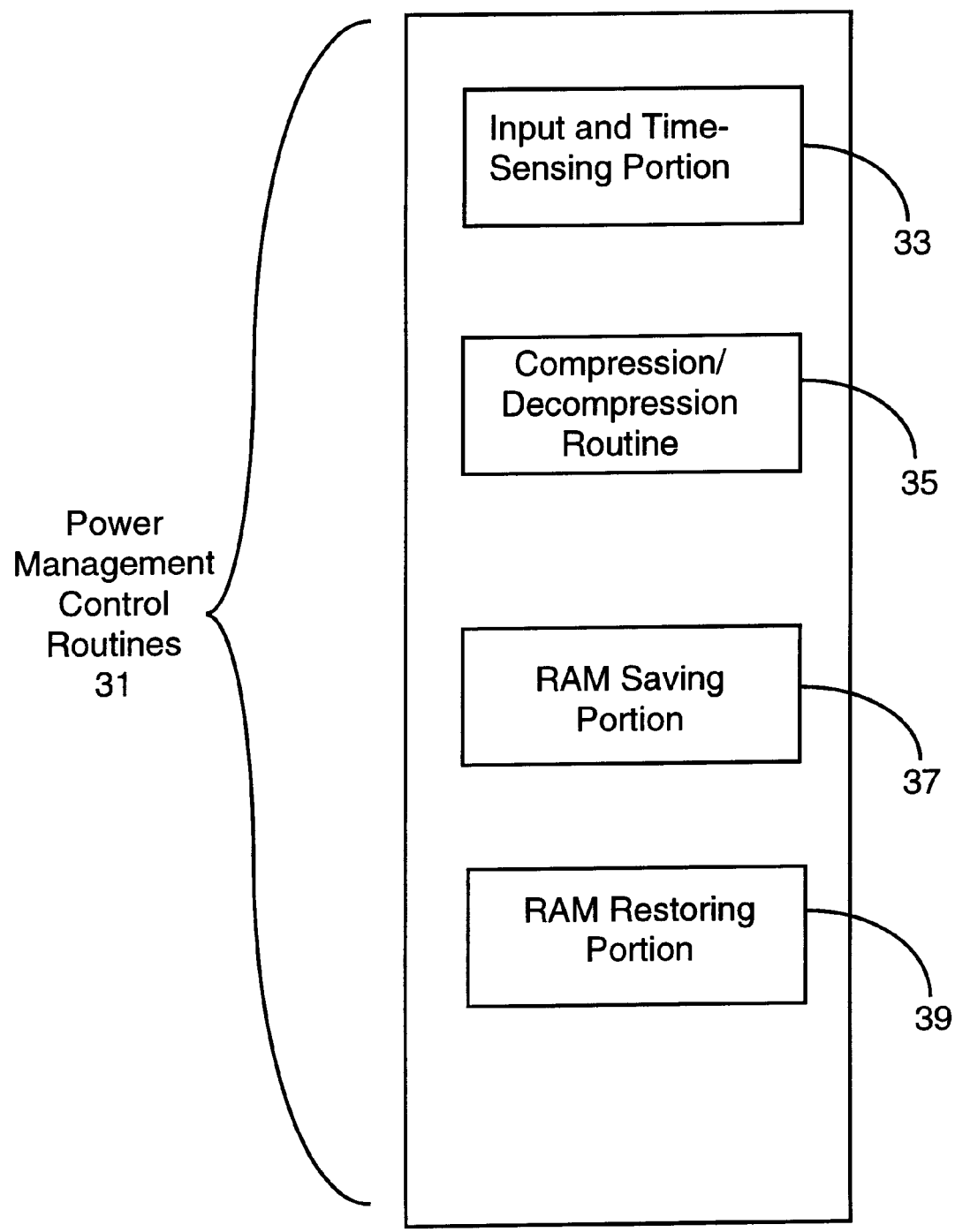
FIG. 1B is a block diagram of a power management control routine in an embodiment of the present invention.

FIG. 1B is a block diagram indicating specific portions of power management control routines 31 according to an embodiment of the present invention. An input sensing and timing portion 33 is responsible for sensing input activity relative to time, so power-saving modes may be initiated after pre-programmed periods of time. For example, ZVS may be initiated after 30 minutes passing with no user input activity, such as a keystroke, pointer movement, or incoming call activating ring indicator 10. The specific times and power levels are not particularly germane to the present invention, as long as one of the activated power modes is ZVS. In power-saving computers known to the inventors, the specific times may be configured.

In the power management control routines of the present invention, as shown in FIG. 1B, a compression/decompression routine 35 is available for use by other portions of the control routines for compressing and decompressing data. There are a number of commercially available compression routines, known to workers with skill in the art, that may be stored and used in the present invention. The compression routine in this example is conveniently a part of the BIOS routines, but may be stored elsewhere, as long as it is accessible to the power management control routines.

RAM saving portion 37 of power management control routines 31 is another routine used in an embodiment of the present invention. This portion is responsible for accessing the system RAM (24 in FIG. 1A) and saving the contents to a non-volatile device, in the present embodiment hard disk drive 22, before power is suspended to the system board in ZVS.

RAM restoring portion 39 is yet another portion of power management control routines 31, and is responsible for accessing hard disk drive 22 when powering back up from ZVS. Operation of these portions of the power management control routines in an embodiment of the present invention is described more fully below.

Figure 2A:
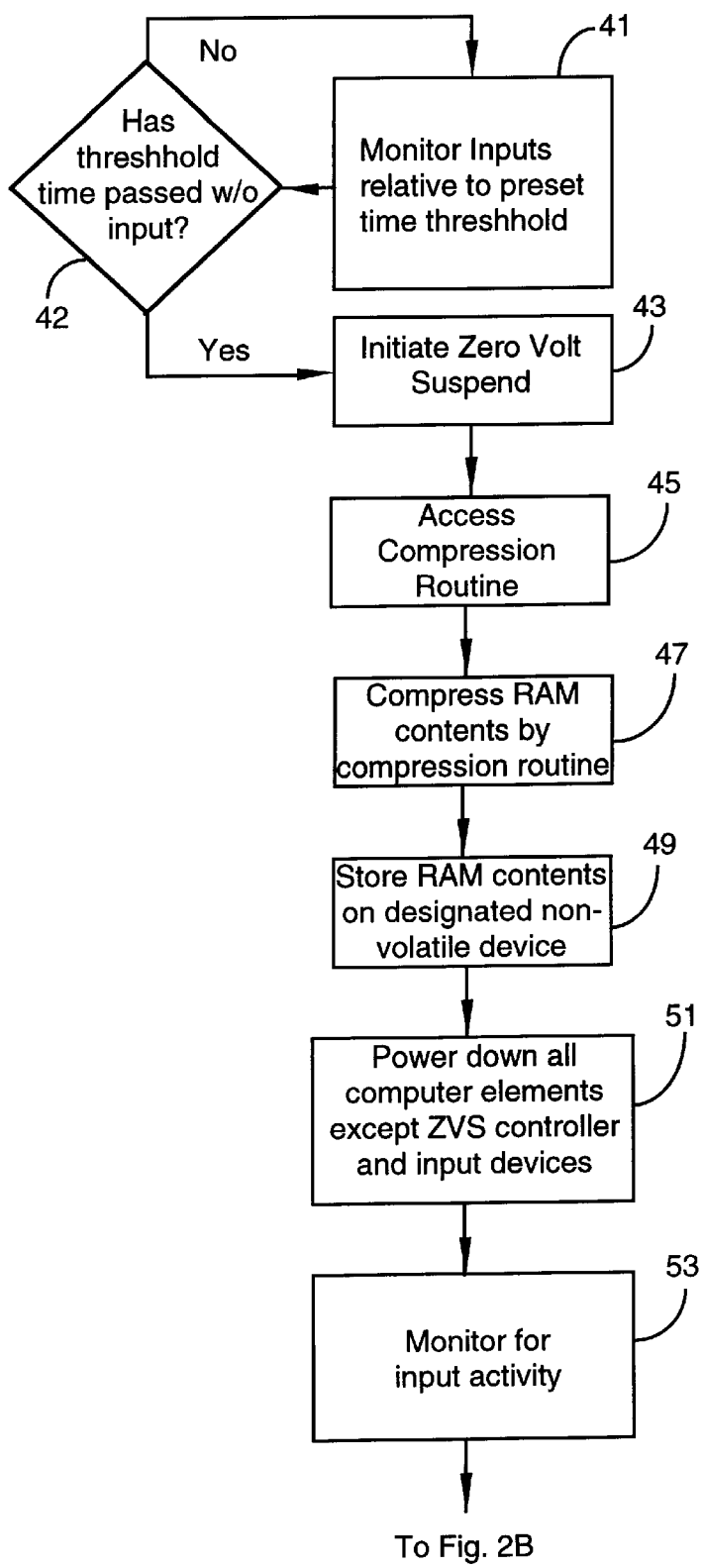
FIG. 2A is a logic flow-diagram for timer-controlled shutdown with data compression and storage in an embodiment of the present invention.

FIG. 2A is a logic flow diagram of operation of power management according to an embodiment of the present invention, using the portions of the control routines as described above. At step 41, which is operable at all times computer 11 is at full power, input activity is monitored relative to time. Portion 33 (FIG. 1B) of the power management control routines is used for this purpose. At decision step 42, if a threshold time $T_1$ is reached without input activity, logic flow goes to step 43, where a unique ZVS sequence is initiated. Otherwise flow goes back to step 41.

After ZVS is initiated, compression/decompression routine 35 (FIG. 1B) is accessed at step 45, and at step 47 contents of system RAM, in this example DRAM 24 (FIG. 1A), are read and compressed, then the compressed version of RAM is stored on disk drive 22 at step 49. Finally, at step 51, power is removed from all system components except the ZVS controller, which in this example is KBC 23, and from KBD 25, PTR 14, RI 10, and RTC 26. RTC 26 may be battery powered rather than powered by the system power supply as shown in FIG. 1A.

Once power is removed to the level of ZVS, the keyboard controller monitors the KBD, PTR 14, and RI 10 at step 53 for any user activity. KBC 25 is configured to restore power via line 40, which operates an electrically-operable element to start power supply module A, upon resumption of any user activity. Once power is restored, power management control routines 31 operate to restore contents of system RAM so activity may resume from the point at which ZVS was initiated.

Figure 2B:
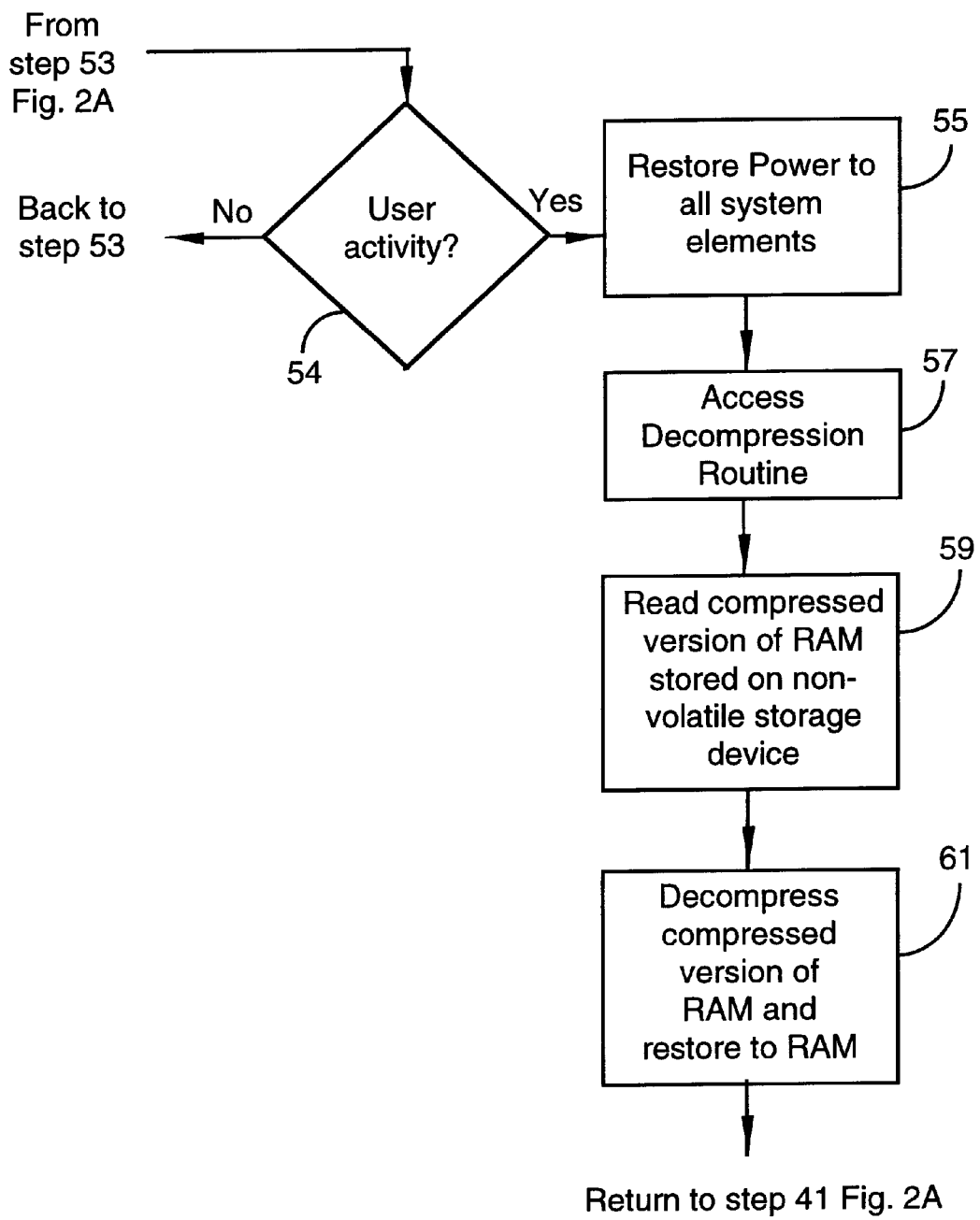
FIG. 2B is a logic flow diagram for resumption of activity after ZVS.

FIG. 2B is a logic flow diagram depicting resumption of activity after ZVS according to the steps of FIG. 2A in an embodiment of the present invention. At step 54, if there is user activity detected, flow goes to step 55. If not, flow loops back to step 53. At step 55 power is restored to all system elements by KBC 23 restarting power supply module A in FIG. 1A.

At step 57 compression/decompression control routines 35 are accessed, and at step 59 the RAM contents previously stored on hard disk 22 are retrieved. At step 61 the compressed RAM contents are decompressed and restored to DRAM 24 (FIG. 1A) using compression/decompression routine 35 (FIG. 1B). The system is now ready to resume computer activities at the point where activity was suspended for ZVS.

Figure 3A:
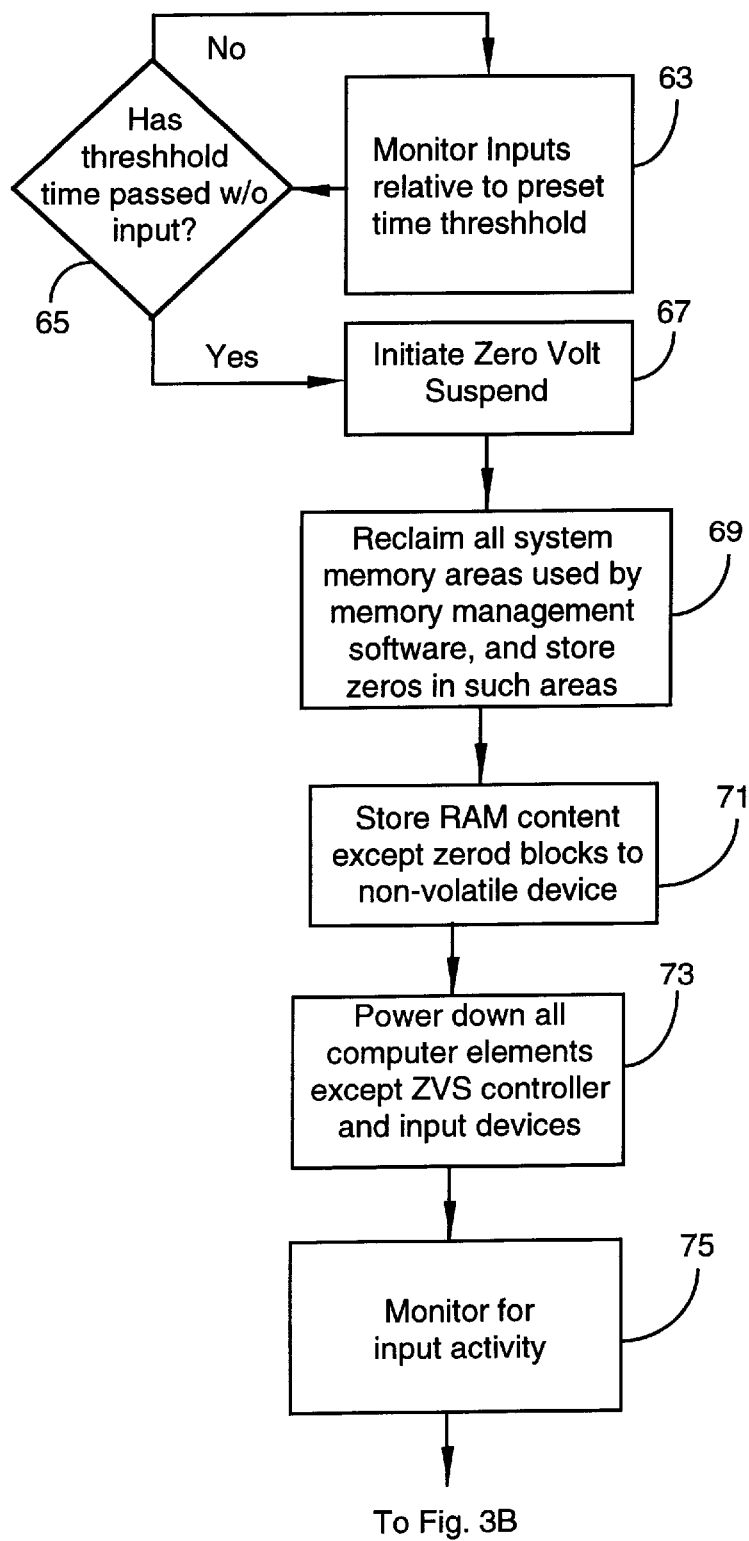
FIG. 3A is a logic flow diagram for timer-controlled shutdown according to a second embodiment of the present invention.

FIG. 3A is a logic diagram depicting execution of ZVS in another embodiment of the present invention. In this embodiment, use is made of the fact that system RAM at any point in operation typically contains several blocks of information and data that are not necessary to be stored to return operation to the same point at which operation is suspended. These blocks include data stored by memory management control routines, such as HIMEM.SYS™, 386MAX™, QEMM™, and so forth, such as cached fonts and/or a memory "scratch pad".

In FIG. 3A, at step 63, user input activity is monitored as in step 41 of FIG. 2A. If a threshold time is reached (Step 65) without activity, logic flow goes to step 67. At step 67 a unique ZVS is initiated. At step 69, all system memory areas used by memory management software are reclaimed, and zeros are stored in these areas. At step 71, all RAM data except zeroed blocks is transferred to a designated non-volatile storage device. At step 73 power is removed from all system components except the ZVS controller, which in this example is KBC 23, and from KBD 25, PTR 14, RI 10, and RTC 26. The system is in then in the ZVS mode. At step 75 the system is monitored for input activity.

Figure 3B:
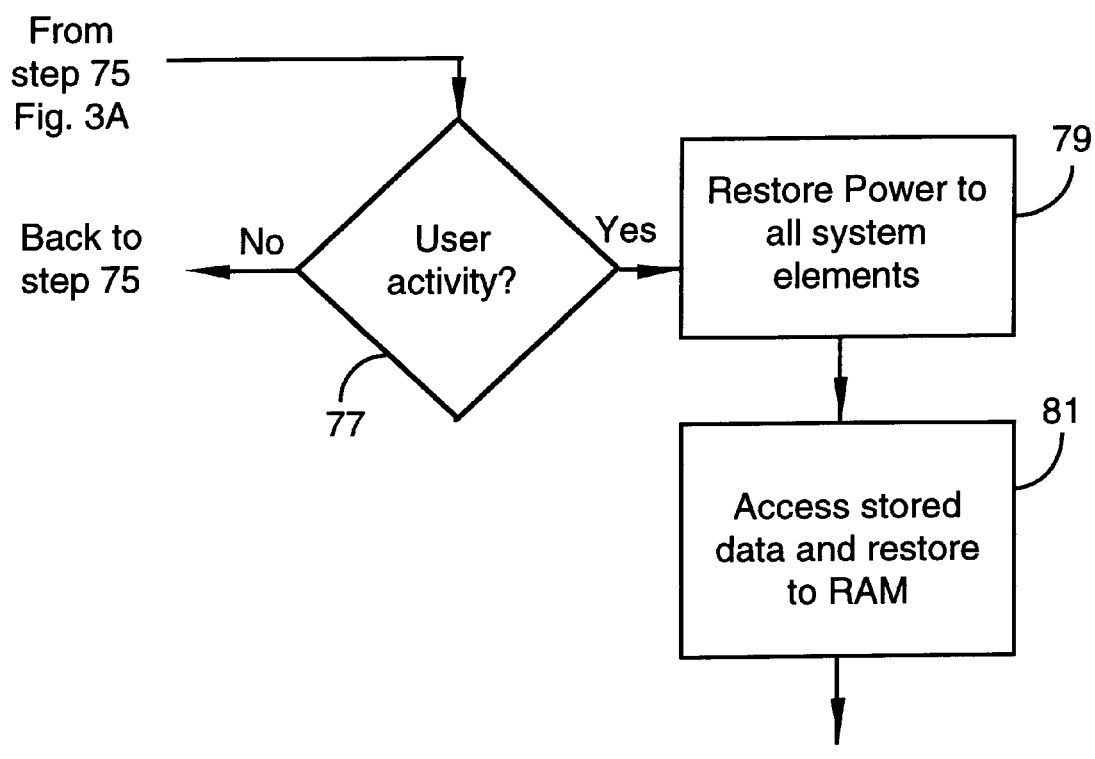
FIG. 3B is a logic flow diagram for resumption of activity after ZVS after shutdown according to FIG. 3A.

FIG. 3B shows the restarting steps for resuming operation at the point ZVS was initiated in FIG. 3A. At step 77, if there is user input activity, logic flow goes to step 79. If there is no activity, flow loops back to step 75, and monitoring continues. At step 79, assuming resumption of user activity, power is restored to all system elements. At step 81 the designated non-volatile device is accessed, and the information stored at step 71 is read and restored to system RAM. The system is now restarted at the point activity was suspended.

Figure 4A:
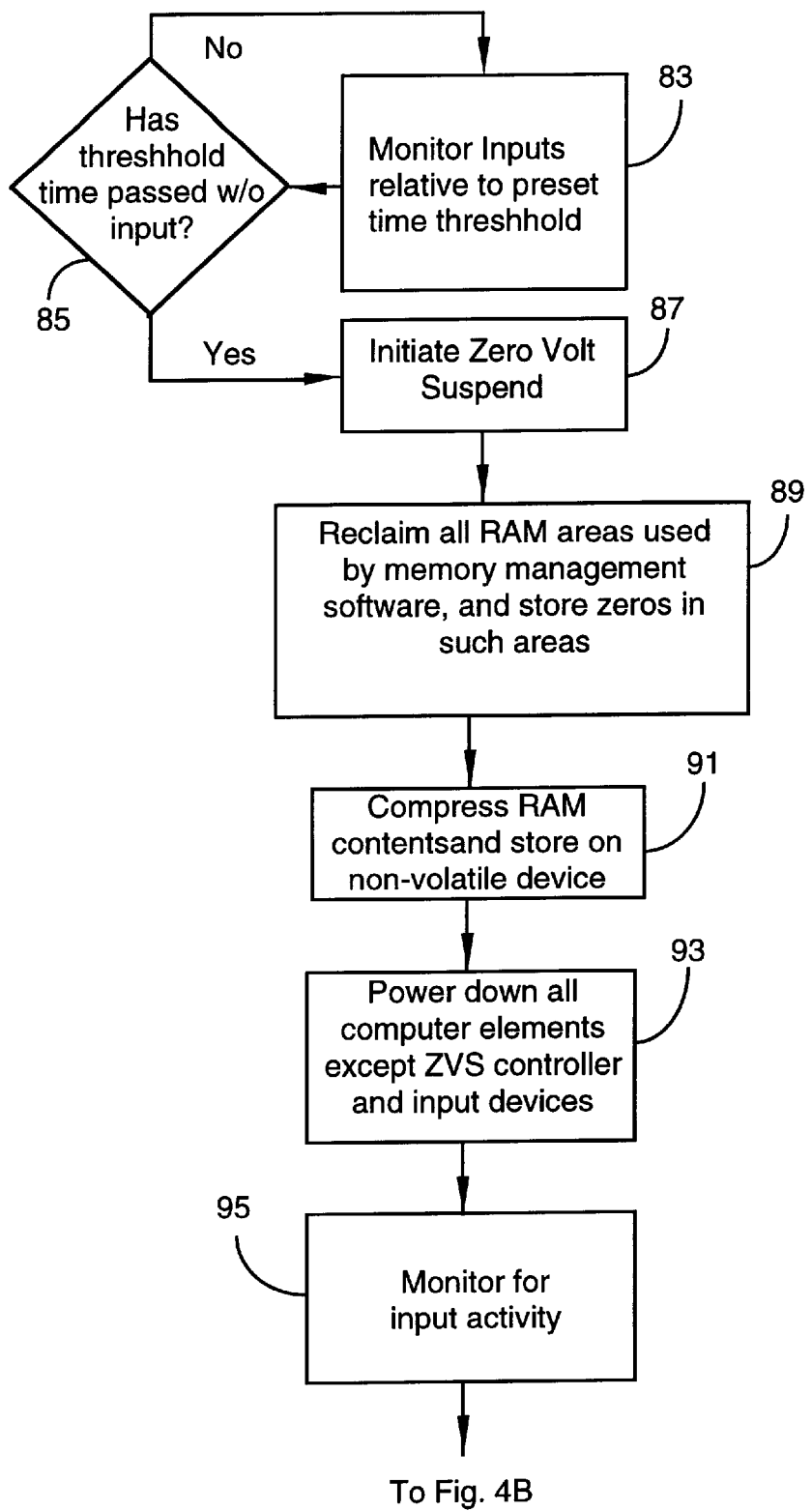
FIG. 4A is a logic flow diagram for a timer-controlled shutdown according to a third embodiment of the present invention.

FIG. 4A is a logic diagram depicting yet another embodiment of the present invention. This embodiment takes advantage of reduction of RAM size by reclaiming areas used by memory management routines, and of compression of remaining data before storage on a designated non-volatile storage device.

In the embodiment of FIG. 4A, at step 83, input activity is monitored relative to time. At decision step 85, if a threshold time is reached without user activity, logic flow goes to step 87. If not, flow loops back to step 83, and monitoring continues.

At step 87 a unique ZVS is initiated. At step 89 all system memory areas used by memory management routines are reclaimed, and zeroes are written to these areas. At step 91, compression/decompression portion 35 (FIG. 1B) is accessed, and RAM contents, including the zeroed areas, is compressed and stored on a designated non-volatile device.

At step 93 all computer elements are powered down except the ZVS controller, which in this example is KBC 23, and from KBD 25, PTR 14, RI 10, and RTC 26. The system is in then in the ZVS mode. At step 95 the system is monitored by the KBC to detect resumption of activity.

Figure 4B:
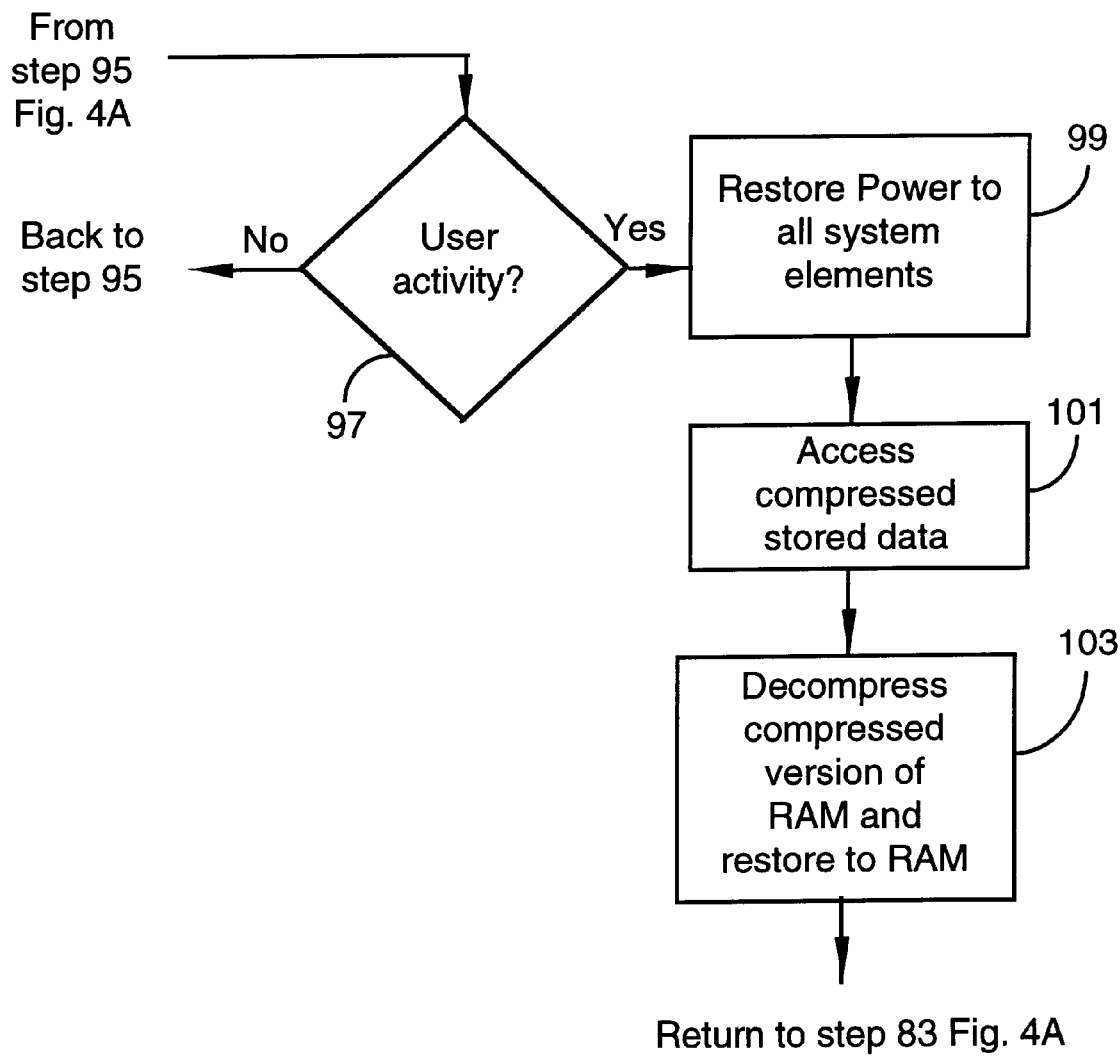
FIG. 4B is a logic flow diagram for resumption of activity after shutdown according to FIG. 4A.

FIG. 4B is a flow diagram depicting restarting the computer from ZVS as practiced in the embodiment of FIG. 4A. At step 97, if user activity is detected, flow goes to step 99. If no activity is detected, flow loops back to step 95.

At step 99 power is restored to all system elements. At step 101 compressed stored data is accessed. At step 103 stored compressed data is decompressed, using compression/decompression routines 35 (FIG. 1B), and the decompressed data is restored to system RAM. The system is now back to the point where ZVS was initiated. Logic flow returns to step 83, and user activity is again monitored relative to time.

The method of FIGS. 4A and 4B takes advantage of the fact that strings of zeroes are highly compressible by all known compression routines. All of the methods depicted provide for storing lass data than system RAM contains when ZVS is initiated, resulting in a smaller file saved to the designated non-volatile device.

It will be apparent to those with skill in the art that there are many alterations in detail that might be made in the embodiments described above without departing from the spirit and scope of the invention. For example, there are, as indicated above, a number of suitable compression/decompression routines known to those with skill in the art, that might be utilized in the present invention. There are similarly many different ways that routines might be composed for the save, restore, and time monitoring functions described in the various embodiments. Programmers are highly individualistic, but such routines are well-known in the art, and within the ordinary skill of those with skill in the art. There are also many variations in system hardware and variations in power management software that may be used without departing from the spirit and scope of the invention.

What is claimed is:

1. A basic input output system (BIOS) for directing input/output functions for a computer, the BIOS having a power management control system, wherein the power management control system comprises:

a first portion adapted to direct a CPU to monitor inputs to the computer relative to time, and to initiate power suspension after passage of a threshold time without input;

a second portion to save random access main memory contents to a non-volatile storage device before power suspension is initiated; and a third portion adapted to compress contents of the random access main memory before saving to the non-volatile storage device;

a fourth portion adapted to place zeros in all areas of the random access main memory used by memory management software prior to compressing contents of RAM.

2. A method for placing a computer having a basic input output system (BIOS) for directing input/output functions for a computer, the BIOS having a power management control system in a power suspension mode with power removed from a random access main memory, the method comprising steps of:

(a) directing a CPU to monitor inputs to the computer relative to time, and to initiate power suspension after passage of a threshold time without input;

(b) saving random access main memory contents to a non-volatile storage device before removing power from the random access main memory, to place the computer in the power suspension mode;

(c) compressing contents of the random access main memory before saving to the non-volatile storage device; and (d) placing zeros in all areas of the random access main memory used by memory management software prior to compressing contents of RAM.

* * * * *